(12) United States Patent
Boulrece

(10) Patent No.: US 10,925,288 B2
(45) Date of Patent: Feb. 23, 2021

(54) DEVICE AND METHOD FOR SLICING LARGE CAKES AND OTHER BAKED GOODS

(71) Applicant: Tocay Boulrece, Highland, IN (US)

(72) Inventor: Tocay Boulrece, Highland, IN (US)

(*) Notice: Subject to any disclaimer, the term of this patent is extended or adjusted under 35 U.S.C. 154(b) by 70 days.

(21) Appl. No.: 14/877,932

(22) Filed: Oct. 8, 2015

(65) Prior Publication Data

US 2016/0100589 A1  Apr. 14, 2016

Related U.S. Application Data

(60) Provisional application No. 62/062,791, filed on Oct. 10, 2014.

(51) Int. Cl.
| | |
|---|---|
| *A21C 15/04* | (2006.01) |
| *B26B 5/00* | (2006.01) |
| *B26B 3/04* | (2006.01) |
| *B26D 3/18* | (2006.01) |

(52) U.S. Cl.
CPC ............. *A21C 15/04* (2013.01); *B26B 3/04* (2013.01); *B26B 5/008* (2013.01); *B26D 3/185* (2013.01)

(58) Field of Classification Search
CPC .......... A21C 15/04; B26D 3/185; B26D 1/52
See application file for complete search history.

(56) References Cited

U.S. PATENT DOCUMENTS

| | | | |
|---|---|---|---|
| 1,463,941 A | 8/1923 | Cusimano | |
| 5,597,113 A * | 1/1997 | Bradford | B29C 65/02 229/120.07 |
| D409,054 S * | 5/1999 | Wirfel | D7/673 |
| D632,140 S | 2/2011 | Burstein | |
| 7,975,396 B2 * | 7/2011 | Mastroianni | A21C 15/04 33/305 |
| 2004/0250667 A1 * | 12/2004 | Atwater | A21C 11/106 83/13 |
| 2008/0216628 A1 | 9/2008 | Hamilton | |
| 2016/0015044 A1 * | 1/2016 | Sy | B26B 3/04 30/114 |

FOREIGN PATENT DOCUMENTS

CN   202524993   11/2012

* cited by examiner

*Primary Examiner* — Sarah B McPartlin
(74) *Attorney, Agent, or Firm* — Hiram Peacock

(57) ABSTRACT

A configurable cutting device for large cakes and other baked items that provides varied shapes and dimensions of cut pieces using a single cutting motion. The handles are ergonomically designed, decorative and provide control of the blades, and the ability to apply increased downward pressure for increased cutting force without direct contact with the blades. The device can be folded down and/or disassembled for easy cleaning and storage.

8 Claims, 4 Drawing Sheets

DEVICE AND METHOD FOR SLICING LARGE CAKES AND OTHER BAKED GOODS

CROSS REFERENCE TO RELATED APPLICATIONS

This application claims priority to and the benefit of U.S. Provisional Patent Application No. 62/062,791, filed on Oct. 10, 2014, the entire contents of which are incorporated by reference in their entirety as if fully set forth herein.

STATEMENT REGARDING FEDERALLY SPONSORED RESEARCH OR DEVELOPMENT

None.

TECHNICAL FIELD

This disclosure relates to systems and methods for slicing large baked goods in general and large cakes more specifically.

BACKGROUND

Cutting a large sheet cake can be a time consuming and somewhat arduous task. Making countless individual slices with a cake knife and cleaning off the accumulated cake from the knife after each cut can make the process seem endless.

In the prior art, many disclosed devices for reducing the number of cuts to be made employ rigidly affixed components to slice bakery cuisine into single fixedly prescribed sizes and shapes. Although effective in reducing the amount of time necessary to make uniform slices, they are ineffective in providing the ability to provide a variety of sizes and shapes in addition to the time savings relative to cutting individual pieces with a knife.

U.S. Pat. No. 1,463,941 to Philip Cusimano provides a cutting device with a plurality of knives for cutting vegetables or other foods into bodies of uniform size. Cusimano further discloses one or more adjusting screws for increasing the amount of space between the knives other than the medial line knife which is not adjustable.

U.S. Pat. No. D632,130 to Claudio Burstein provides the ornamental design for a more portable folding cake slicer.

U.S. Pat. No. 7,975,396 to Jeffrey Mastroianni discloses a pan and template for cutting baked goods into a plurality of diamond or rectangular shaped portions.

SUMMARY

In one exemplary modular embodiment, one or more sets of horizontal and vertical cutting blades interconnect to form an appropriate slicing configuration for the sheet cake or other baked good to be cut. The width and length of the slices can be adjusted by the removal of individual blades while maintaining the integrity of the remaining blades for use in the cutting process. Because of the interconnected configuration of the horizontal and vertical blades, it can be folded down for easy storage.

In a non-modular embodiment, a multitude of equidistant vertical and horizontal cutting blades are provided with handles at opposite ends to enable the user to place the device on top of a cake or other baked good to be served. The handles allow the user to slice down into the cake and remove the device from one section to slice additional sections as necessary.

Certain advantages of the device and methods include: adjustability to accommodate a variety of shapes and sizes of slices, ease of assembly and disassembly, improved durability, and ease of storage, among others. The device is also safe, cost effective and useful for all segments of the population, including both consumer and commercial applications.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

Figure 1:
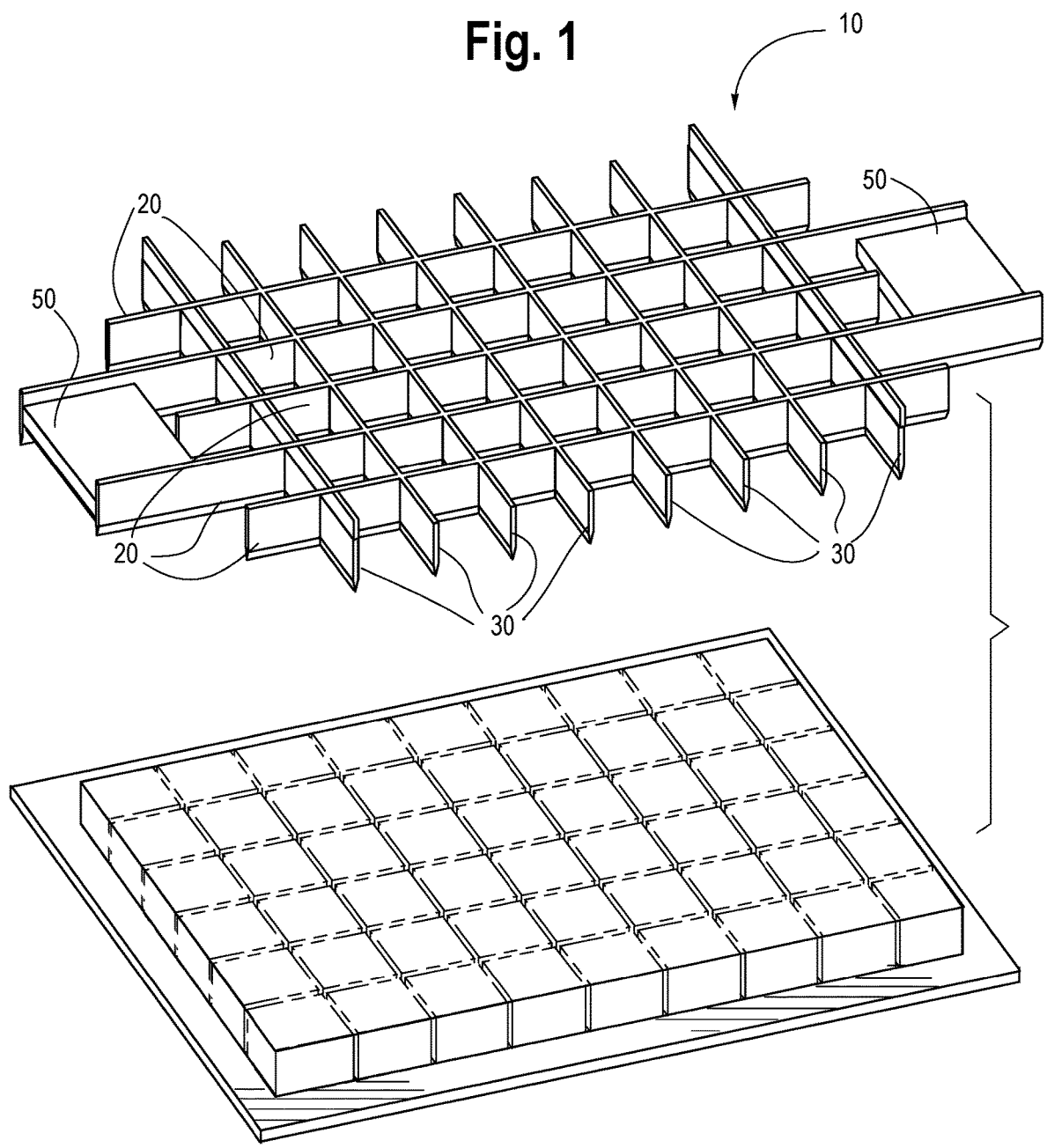
FIG. 1 is a top perspective view of an embodiment of the non-modular device.

FIG. 1 shows a top perspective view of the non-modular cake or baked goods slicing device, 10 having handles, 50 for improved gripping and increased downward cutting force. The unrestricted borders of the device have protruding blades that allow variations in size and configuration of the pieces cut.

Figure 2:
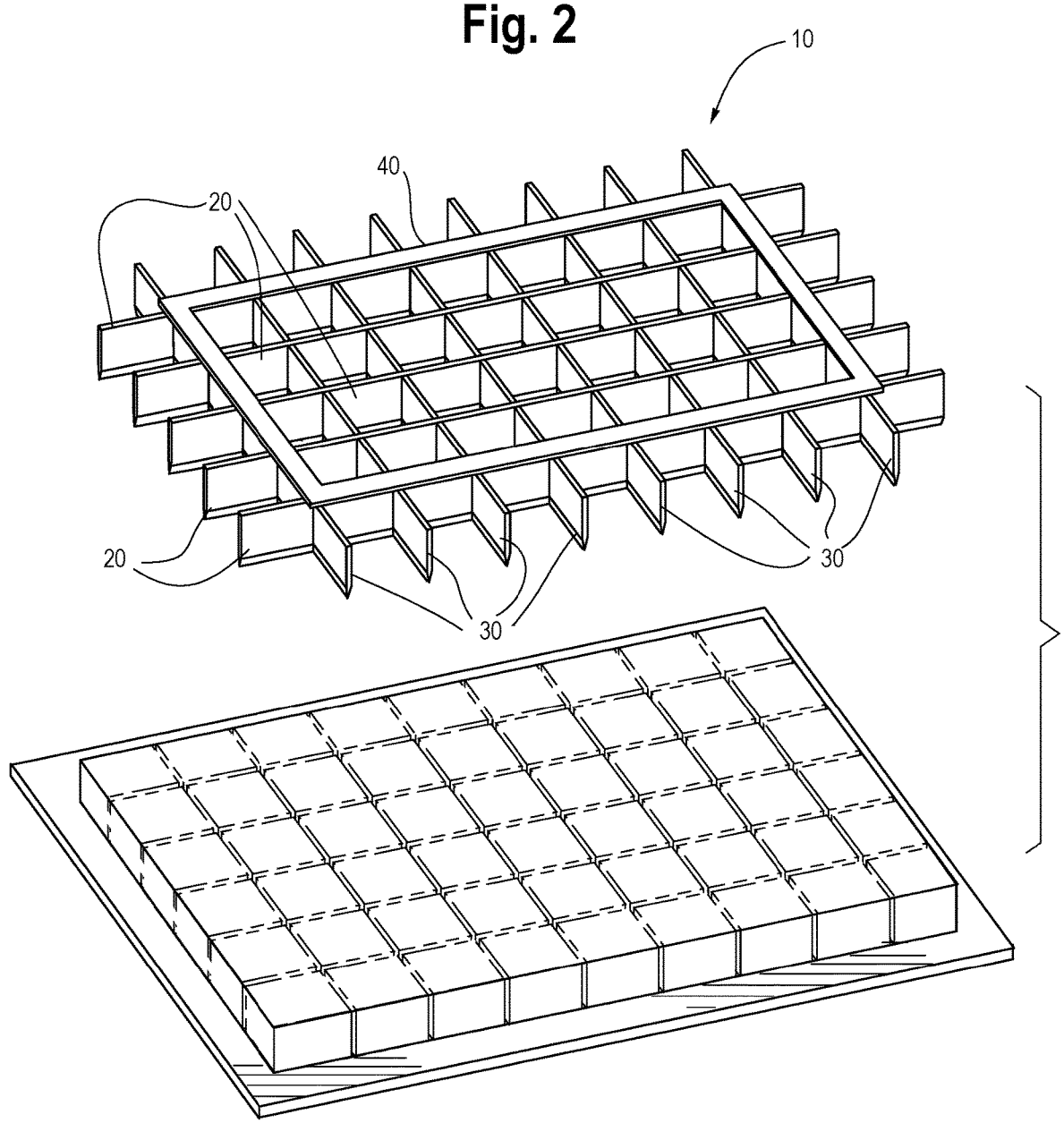
FIG. 2 is a top perspective view of an embodiment of the modular device.

FIG. 2 shows a top perspective view of the modular device 10 where the sides of the horizontal blades, 20 and vertical blades, 30 and handles 50 are seen.

Figure 3:
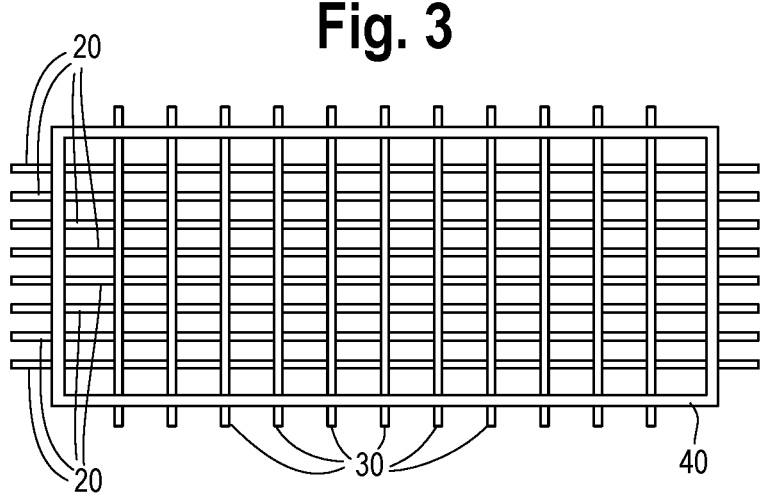
FIG. 3 is a top view of an alternate embodiment of the modular device.

FIG. 3 shows an embodiment of the modular device configured to have 11 vertical blades, 30 and 8 horizontal blades, 20 for a large number of cuts and small pieces.

Figure 4:
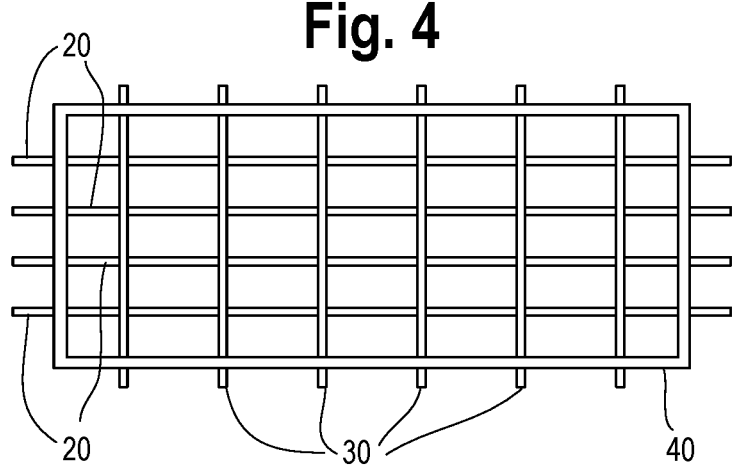
FIG. 4 is a top view of an alternate embodiment of the modular device.

FIG. 4 shows an embodiment of the modular device configured to have 6 vertical blades, 30 and 4 horizontal blades, 20 for a decreased number of cuts and larger pieces, relative to FIG. 3.

Figure 5:
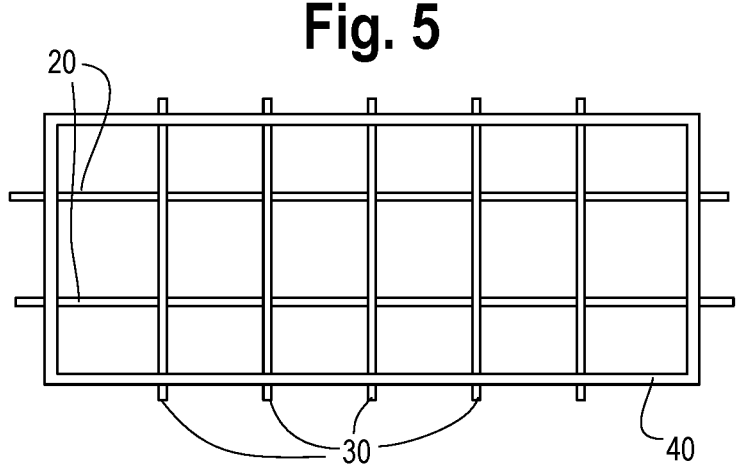
FIG. 5 is a top view of an alternate embodiment of the modular device.

FIG. 5 shows an embodiment of the modular device configured to have 5 vertical blades, 30 and 2 horizontal blades, 20 for a decreased number of cuts and larger pieces, relative to FIG. 4.

Figure 6:
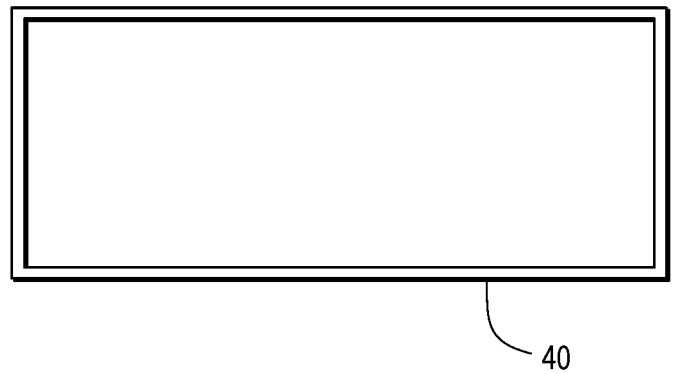
FIG. 6 is a top view of the top restraint of the modular device.

FIG. 6 shows a top view of the top restraint, 40 of the modular device.

Figure 7:
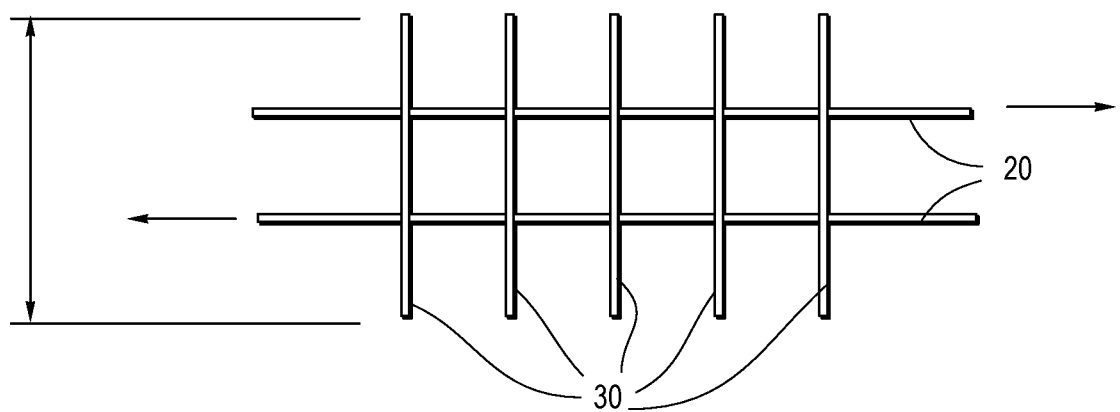
FIG. 7 is a top view of the horizontal and vertical blades of the modular device showing directional movement of the horizontal blades.

FIG. 7 shows the direction of movement of the blades of the modular device to afford an angled position of the blades for storage.

Figure 8:
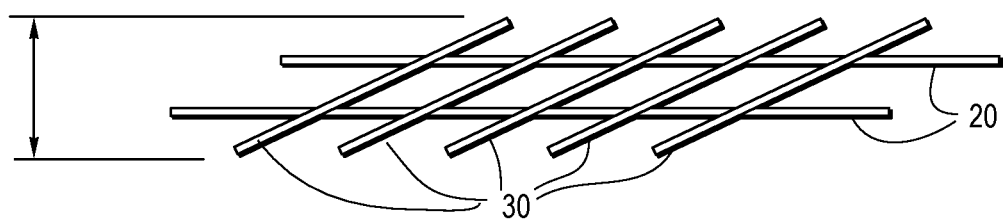
FIG. 8 is a top perspective views of the folded modular device.

FIG. 8 shows the blades angled to a folded position for easy cleaning and storage.

DETAILED DESCRIPTION

The modular and non-modular embodiments of the device provide a wide range of configurations for slicing large items or baked goods with a variety of shape geometries for the slices. The unrestricted borders of the device have protruding blades that allow variations in cake and baked goods size and configuration.

The modular embodiments are selectively configurable to the shape and size of the item being cut, in addition to being configurable to the shape and size of pieces desired by the user. The configuration of FIG. 3 provides a large number of smaller pieces in the center and some larger pieces around the perimeter. The configuration of FIG. 4 provides a relatively smaller number of larger pieces than FIG. 3. The configuration of FIG. 5 provides a smaller number of larger pieces than FIGS. 3 and 4.

Each of the configurations shown in FIGS. 3 through 5 is achieved by adjusting the number of cutting blades provided in the device. Once the desired number of blades is achieved, the configuration of the blades is secured by the top restraint, 40 shown in FIG. 6. The top restraint, 40 is a rectangular frame-like element that is placed above the removable horizontal and vertical blades and provides a means for evenly transferring the downward pressure applied throughout the entirety of the intersecting vertical and horizontal blades during the slicing process.

The device may be configured to provide a variety of cut shapes through the blade angle adjustments afforded by the angled movement of the blades as seen in FIG. 7 and FIG. 8. The slices can be provided in a multitude of shapes, including but not limited to parallelograms, and diamond shapes.

When not in use, the cutting blades of the modular embodiments may be angled to be closer together to provide a stacked or layered effect to reduce the amount of space required for storage. The interconnection of the vertical blades and the horizontal blades allow for easy disassembly for cleaning, storage and portability.

Both the modular and non-modular embodiments are dishwasher safe.

A number of illustrative embodiments have been described. Nevertheless, it will be understood that various modifications may be made without departing from the spirit and scope of the various embodiments presented herein. For example, modular or non-modular embodiments in a circular or oval shape are contemplated within the scope of the invention. Accordingly, other embodiments are within the scope of the following claims.

What is claimed is:

1. A device for reducing the time and effort required to slice large cakes and other baked goods comprising:
    a first set of substantially parallel horizontal cutting blades wherein each horizontal blade has at least one blade edge and a face;
    a second set of substantially parallel vertical cutting blades removably connected to said first set of substantially parallel horizontal cutting blades wherein each vertical cutting blade has at least one blade edge and a face; and
    one or more handles, wherein each of said one or more handles is positioned orthogonal to said face of at least two of said parallel horizontal cutting blades, orthogonal to said face of one of said vertical cutting blades and in a plane that intersects said first set of substantially parallel horizontal cutting blades and said second set of substantially vertical cutting blades whereby a plurality of slices can be completed by moving the device through the large cake or other baked good with a single motion.

2. The device of claim 1, wherein said one or more handles are attached to and extend between two of the horizontal cutting blades so that additional downward force can be applied to the one or more handles when cutting and additional upward lifting force can be applied to the one or more handles when lifting after slicing.

3. A device for reducing the time and effort required to cut large cakes and other baked goods into various sized pieces comprising:
    two or more removably attached parallel and substantially equidistant horizontal cutting blades each having a top edge with a first top edge end and a second top edge end;
    three or more removably attached parallel and substantially equidistant vertical cutting blades interconnected with said two or more horizontal cutting blades and each having a top edge with a first top edge end and a second top edge end; wherein the first top edge ends and the second top edge ends of each of the horizontal cutting blades and the vertical cutting blades lie along a perimeter of the device; and a top restraint extending around the perimeter of the device and positioned adjacent the top edges of the horizontal and vertical cutting blades for removably securing the vertical and horizontal cutting blades in a predefined configuration.

4. The device of claim 3 wherein one or more of the horizontal and vertical cutting blades can be removed from the device while the remaining blades remain secured in place by the top restraint whereby larger pieces are created by the device.

5. The device of claim 3 wherein the horizontal cutting blades and the vertical cutting blades are interconnected to allow angled movement of the blades whereby the horizontal and vertical cutting blades can be detached from the top restraint and folded down for storage.

6. A method of using a cutting device for reducing an amount of time and effort required to cut a large unitary item into many substantially uniform smaller pieces comprising:
    providing a large unitary item to be cut;
    determining a desired size, shape and number of substantially uniform smaller pieces;
    attaching two or more horizontal cutting blades and three or more vertical cutting blades together in a configuration to cut the large unitary item into the substantially uniform smaller pieces;
    attaching a top restraint to a top edge of each of the horizontal and vertical cutting blades along a perimeter of the cutting device wherein opposite top edge ends of each of the horizontal and vertical cutting blades lie along the perimeter;

holding the cutting device above the large unitary item to be cut; and applying downward pressure on the cutting device to cut through the item and create the substantially uniform smaller pieces.

7. The method of claim 6 further comprising directly attaching one or more ergonomic handles at opposing ends of the cutting device for increased downward cutting force.

8. The method of claim 7, further comprising pulling the handles in an upward motion to separate the cutting device from the substantially uniform smaller pieces.

* * * * *